United States Patent [19]
Morita

[11] Patent Number: 5,883,873
[45] Date of Patent: Mar. 16, 1999

[54] FOCUSING DISTANCE OF AN OBJECTIVE LENS ACCORDING TO A VERTICAL DEVIATION STANDARD OF OPTICAL RECORDING MEDIA WITH DIFFERENT THICKNESSES

[75] Inventor: Hideji Morita, Higashihiroshima, Japan

[73] Assignee: Sharp Kabushiki Kaisha, Osaka, Japan

[21] Appl. No.: 895,374

[22] Filed: Jul. 16, 1997

[30] Foreign Application Priority Data

Jul. 16, 1996 [JP] Japan .................................... 8-186291
Nov. 28, 1996 [JP] Japan .................................... 8-318318

[51] Int. Cl.⁶ .................................................. G11B 7/125
[52] U.S. Cl. .................. 369/112; 369/44.23; 369/44.37; 369/94
[58] Field of Search ................................. 369/112, 44.23, 369/94, 44.37, 118, 117

[56] References Cited

U.S. PATENT DOCUMENTS

| | | | |
|---|---|---|---|
| 5,526,336 | 6/1996 | Park et al. .................................. | 369/94 |
| 5,638,353 | 6/1997 | Takahashi ................................. | 369/112 |
| 5,665,957 | 9/1997 | Lee et al. ................................... | 369/118 |
| 5,671,207 | 9/1997 | Park ........................................... | 369/112 |
| 5,699,341 | 12/1997 | Sugi et al. ................................. | 369/112 |
| 5,724,334 | 3/1998 | Ohba et al. ............................... | 369/112 |

FOREIGN PATENT DOCUMENTS

| | | |
|---|---|---|
| 7 31458 A1 | 9/1996 | European Pat. Off. . |
| 7 85543 A2 | 7/1997 | European Pat. Off. . |
| 62 3441 | 1/1987 | Japan . |
| 01 3833 | 1/1989 | Japan . |
| 3 62342 | 3/1991 | Japan . |
| 5 54406 | 3/1993 | Japan . |
| 5 303766 | 11/1993 | Japan . |
| 6 124477 | 5/1994 | Japan . |
| 6 215406 | 8/1994 | Japan . |
| 6 215406 A | 8/1994 | Japan . |
| 6 259804 A | 9/1994 | Japan . |
| 7 057271 A | 3/1995 | Japan . |
| 7 302437 | 11/1995 | Japan . |
| 8 017068 A | 1/1996 | Japan . |
| 8 45105 | 2/1996 | Japan . |
| 8 062493 A | 3/1996 | Japan . |
| 8 130167 | 5/1996 | Japan . |
| 8 263869 A | 10/1996 | Japan . |
| 97 08691 A1 | 3/1997 | WIPO . |

OTHER PUBLICATIONS

"A Compact Disc Compatible Digital Video Disc Pickup Using Annular Mask" Chul Woo Lee, et al., International Symposium on Optical Memory and Optical Data Storage, vol. 12, 1996 Technical Digest Series (Optical Society of America), pp. 348–350.

*Primary Examiner*—Tod R. Swann
*Assistant Examiner*—Kim-Kwok Chu

[57] ABSTRACT

An optical recording and reproducing device of the present invention has an objective lens designed so as to form a light spot with a set diameter on a DVD, while to form, on a CD, a light spot with a set diameter different from the above diameter. Respective working distances WD1 and WD2 with respect to the DVD and the CD are set in accordance with deflection standards F for the DVD and the CD, respectively. By doing so, as compared with conventional cases where the deflection standards F are not taken into consideration, the working distance WD1 is decreased. As a result, the device is thinned, compared with the conventional cases.

12 Claims, 14 Drawing Sheets

FOCUSING DISTANCE OF AN OBJECTIVE LENS ACCORDING TO A VERTICAL DEVIATION STANDARD OF OPTICAL RECORDING MEDIA WITH DIFFERENT THICKNESSES

FIELD OF THE INVENTION

The present invention relates to an optical recording and reproducing device capable of recording, reproducing, and erasing information with respect to various types of information recording media differing in specification and standard.

BACKGROUND OF THE INVENTION

Practical application of optical disk reproducing devices for reproducing optical disks such as a CD (compact disk) and an LD (laser disk) has been promoted in a wide range. Such optical disk reproducing devices are for reproducing information recorded in optical disks by converging a light beam such as a semiconductor laser emitted from a light source by the use of an objective lens so that the light beam is converged and projected on a signal surface of the disk, and detecting a reflected light from the optical disk by the use of a photodetector.

Recently further densification of the recording density is attempted with respect to the optical disks, which results in that disks differing from the conventional optical disks in standard exist.

In other words, a size of a pit which is a unit of recorded information is about 0.83 $\mu$m in a CD, whereas it is 0.4 $\mu$m in a DVD (digital video disk) which has been newly proposed. In addition, a space between rows of the information recording units, that is, a track pitch, is 1.6 $\mu$m in the CD, whereas it is as narrow as 0.74 $\mu$m in the DVD.

Incidentally, a recording density of an optical disk is determined in accordance with a size of a light spot of a recording-reproducing-use light beam emitted from an optical head (pickup) for reading a fine pit provided on the optical disk for information recording.

A diameter of the light spot is determined by a wavelength of the light beam used and a numerical aperture NA of the objective lens, and it is expressed as:

spot diameter=$k$×light beam's wavelength/$NA$ where k is a constant. Therefore, to make the light spot size smaller so as to read a high-density optical disk, it is necessary to use a light beam having a short wavelength or to use an objective lens having a greater numerical aperture NA.

Usually an optical head has only one objective lens, an optical head having an objective lens with respect to a high-density optical disk, that is, an optical lens having a great numerical aperture NA, usually cannot read a conventional-standard optical disk. This is because according to the conventional standard optical disk is allowed to have warp to some extent, whereas a high-density optical disk is only allowed to have slight warp because a light spot of an optical head for a high-density optical disk is easily distorted by any tilt of an optical disk with respect to an objective lens.

Note that distortion of the light spot is affected by thickness of the optical disk. That is, if the optical disk is thin, the light spot distortion is small even when the disk is tilted. Therefore, a thin disk is sometimes used as a substrate of a high-density optical disk.

Incidentally, various optical recording and reproducing devices which are, even when used alone, capable of reproducing various types of optical disks differing in specification and standard are proposed now.

For example, the Japanese Publication for Laid-Open Patent Application No. 6-124477/1994 (Tokukaihei No. 6-124477) discloses an optical head arranged as follows: a liquid crystal filter is provided between a collimating lens and a deflecting beam splitter, and by adjusting a voltage applied to electrodes provided in the liquid crystal filter, a diameter of a light flux entering an objective lens is changed, thereby switching a numerical aperture NA of an objective lens. Therefore, a reproducing device having the optical head thus arranged is capable of, even when used alone, reproducing optical disks of different recording densities.

The Japanese Publication for Laid-Open Patent Application No. 5-54406/1993 (Tokukaihei No. 5-54406) discloses an optical head arranged as follows: a spherical aberration compensating lens for converging a light beam without aberration, which corresponds to a plurality of disk substrates with different thicknesses, is inserted in and taken away from a light flux entrance side of an objective lens. By doing so, a reproducing device having this optical head is made capable of, even when used alone, reproducing various optical disks differing in thickness.

However, with any of these conventional techniques, it is impossible to freely set a position of a focus of the objective lens, and hence a motion range of the objective lens is naturally determined in accordance with a thickness of the optical disk and deflection (caused by warp and others of the disk) which is regulated by the standard. The thickness dimension of the optical head is determined in accordance with the motion range of the objective lens. Herein, position relations between a DVD 11 and a objective lens 4 and between a CD 12 and the objective lens 4 are shown in FIG. 16. Note that a left half from a center line illustrates a state of a reproducing operation with respect to the DVD 11, whereas a right half from the center line illustrates a state of a reproducing operation with respect to the CD 12.

As shown in the figure, in the case where an optical head corresponding to the DVD 11 is used for reproducing the CD 12, if only a working distance 2 of the CD 12 (a distance from the objective lens 4 to the CD 12; hereinafter referred to as WD2) is set, a working distance 1 of the DVD 11 (a distance from the objective lens 4 to the DVD 11; hereinafter referred to as WD1) is automatically determined in accordance with a difference between positions of information recording surfaces of the DVD 11 and the CD 12, which is, a difference between respective optical distances of passage of light through the disks, that is, respective distances from lower surfaces of the disks to the information recording surfaces (a difference between the substrate thicknesses Dt1 and Dt2).

Let the substrate thickness Dt1 of the DVD 11 be 0.6 mm, and the substrate thickness Dt2 of the CD 12 be 1.2 mm, and a difference (physical difference) between positions of the spot on the DVD 11 and the CD 12 is found as Dt2−Dt1=0.6 mm. Then, the optical distance (equivalent to WD1−WD2), found by dividing the physical distance by an index of refraction, is about 0.6/1.5=0.4.

Therefore, since the CD 12 has WD2 of about 1.6 mm (described later), WD1 of the DVD 11 is found as follows:

$$WD1 = WD2 + \text{optical distance}$$
$$= 1.6 + 0.4$$
$$= 2.0 \text{ mm}$$

Therefore, in the conventional arrangement, the working distance WD1 of the DVD 11 is too great, and as a result there arises a problem that the optical head becomes bulky.

SUMMARY OF THE INVENTION

The object of the present invention is to provide a thin type of an optical recording and reproducing device which is capable of carrying out recording, reproduction, or erasion of information with respect to information recording media differing in specification and standard.

To achieve the above object, an optical recording and reproducing device of the present invention, which is capable of carrying out recording, reproduction, and erasion of information with respect to information recording media which differ in thickness and recording density, by projecting light thereon, comprises an objective lens designed so as to form a light spot with a first predetermined diameter on a first information recording medium, while so as to form a light spot with a second predetermined diameter on a second information recording medium, the first and second diameters differing from each other, the first and second information recording media differing in recording density. The device is characterized in that respective distances between the objective lens and the first and second information recording media are set in accordance with deflection standards of the first and second information recording media, respectively.

With the foregoing arrangement, since the respective distances between the objective lens and the first and second information recording media are set in accordance with deflection standards of the first and second information recording media, respectively, each distance between the objective lens and the first or second information recording medium is decreased, compared with conventional cases where deflections are not taken into consideration. Therefore, with the aforementioned arrangement, the device can be thinned, compared with the conventional cases.

Besides, to achieve the above-described object, the optical recording and reproducing device of the present invention, which is capable of carrying out recording, reproduction, and erasion of information with respect to information recording media which differ in thickness and recording density, by projecting light thereon from a light source through an objective lens, comprises (1) light intercepting means, provided in an optical path between the light source and the objective lens, for partly blocking the light, the light intercepting means having a ring shape concentric with the objective lens, and (2) focus position changing member for adjusting a position of a focus in accordance with an information recording medium used, so that the focus comes on the information recording medium, the focus position changing member being movably provided so as to be inserted in an optical path between the light source and the objective lens when necessary.

With the foregoing arrangement, the light emitted from the light source is projected on the information recording medium through the objective lens. Herein, the light which would transmit the objective lens is partly blocked by the light intercepting means provided in the optical path between the light source and the information recording medium. The light not blocked by the light intercepting means, that is, the light passing through inside the light intercepting means or passing outside the same is converged by the objective lens, and a light spot with an appropriate diameter corresponding to the information recording medium is formed on the information recording medium. Note that an inside diameter and an outside diameter of the light intercepting means are desirably set, for example, so that efficiency of utilization of light to transmit the objective lens is enhanced.

Furthermore, since the focus position changing member is inserted in the optical path between the light source and the objective lens when necessary, the focus position is changed in accordance with an information recording medium used. With this arrangement, the distance between the information recording medium and the objective lens is decreased, as compared with the conventional arrangement wherein the focus position changing member is not provided. As a result, the device can be made thinner.

Therefore, with the above-described arrangement, an optical recording and reproducing device achieving improved efficiency in light utilization as well as being made thinner can be obtained.

For a fuller understanding of the nature and advantages of the invention, reference should be made to the ensuing detailed description taken in conjunction with the accompanying drawings.

DESCRIPTION OF THE PREFERRED EMBODIMENTS

[First Embodiment]

Figure 1:
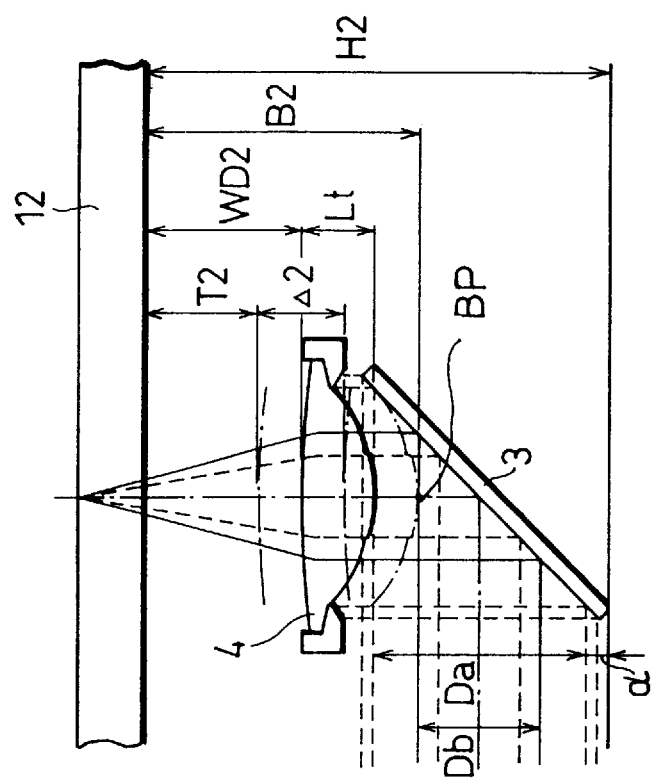
FIG. 1(a) is a cross-sectional view illustrating a state of a reproducing operation of an optical recording and reproducing device of the present invention with respect to a DVD.
FIG. 1(b) is a cross-sectional view illustrating a state of a reproducing operation of the optical recording and reproducing device with respect to a CD.
Figure 1:
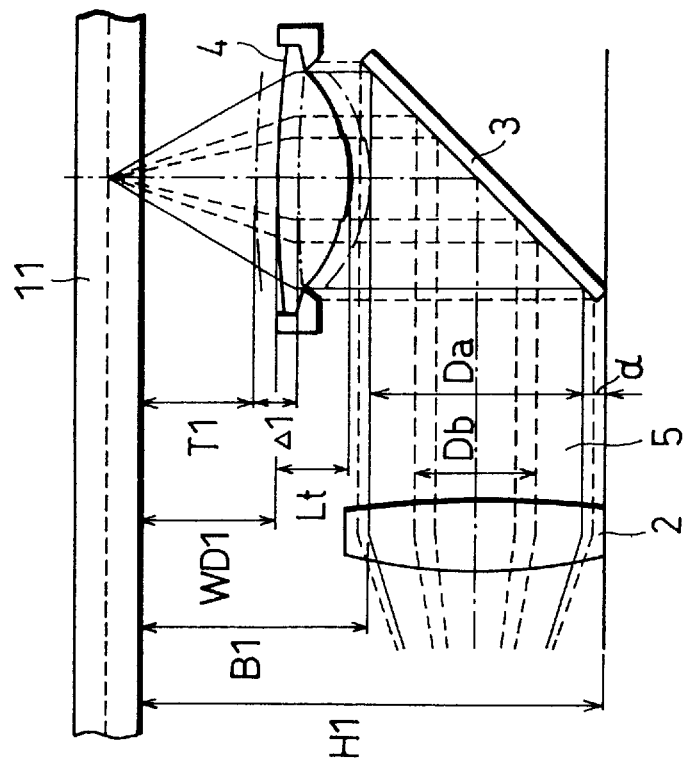

The following description will discuss an embodiment of the present invention, while ref erring to FIGS. 1 through 7.

An optical recording and reproducing device in accordance with the present embodiment has a light source 1, a collimating lens 2, a reflection mirror 3, and an objective lens 4.

The light source 1 is to emit a light beam, for example, a semiconductor laser. The collimating lens 2 is to parallelize a light emitted from the light source 1 so as to make it a parallel light flux 5. The reflection mirror 3 is provided so as to reflect the light flux 5 from the collimating lens 2 and direct it toward the objective lens 4. The objective lens 4 has a function of converging the light flux 5 entering therein, and forming a light spot on an information recording surface of, for example, a DVD 11 (first information recording medium).

The objective lens 4 is attached to a holding body 6. The holding body 6 is supported by a supporting member 7 which has flexibility so as to swing in horizontal and vertical directions. A base 8 supporting the supporting member 7 is fixed on a housing 9, while so are the light source 1, the collimating lens 2, and the reflection mirror 3.

Figure 3A:
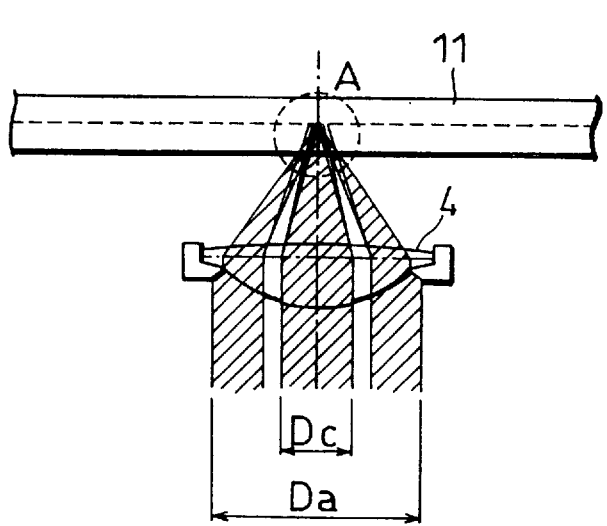
FIG. 3(a) is a cross-sectional view illustrating a state where a light flux passing through an objective lens is converged onto an information recording surface of the DVD.
Figure 3B:
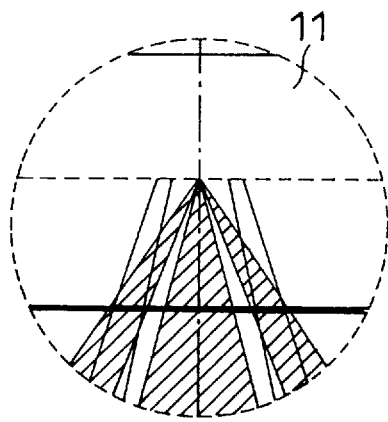
FIG. 3(b) is an enlarged view of a section A in FIG. 3(a).
Figure 3C:
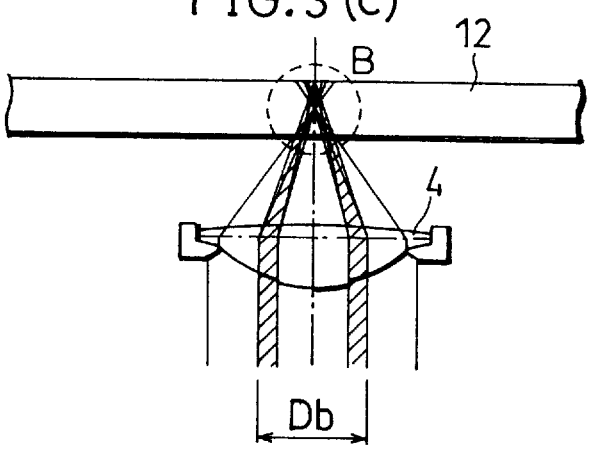
FIG. 3(c) is a cross-sectional view illustrating a state where a light flux passing through the objective lens is converged onto an information recording surface of the CD.
Figure 3D:
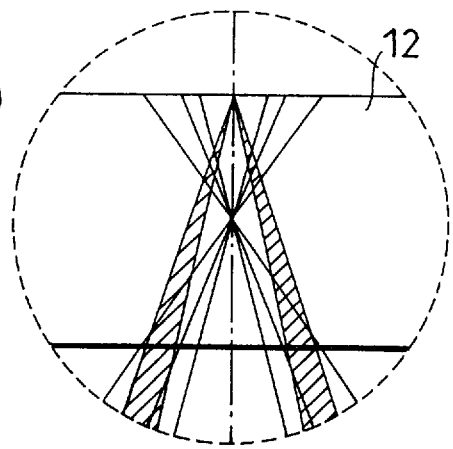
FIG. 3(d) is an enlarged view of a section B in FIG. 3(c).
Figure 3E:
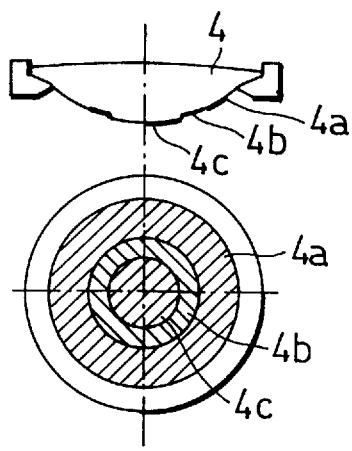
FIG. 3(e) is a cross-sectional view and a plan view of the objective lens.

The objective lens 4 i s arranged so as to be capable of forming a light spot with a predetermined diameter on the DVD 11, while forming another spot with a different diameter on a CD 12 (second information recording medium) having a recording density different from that of the DVD 11. To be more specific, on a surface of the objective lens 4 on a light flux entrance side, there are provided a ring-shaped region 4a with an outside diameter Da, a ring-shaped region 4b with an outside diameter Db, and a disk-shaped region 4c with a diameter Dc in a concentric form, as illustrated in FIGS. 3(a), 3(c), and 3(e). The outside diameter Da is set so as to make a numerical aperture NA of the objective lens 4 great so that a small spot is formed on the information recording surface of the DVD 11. The diameter Db is set so as to make the numerical aperture NA small so that a large spot is formed on an information recording surface of the CD 12. With this arrangement, positions of a focus of the objective lens 4 with respect to the DVD 11 and the CD 12 are determined in accordance with the respective numerical apertures NA for the DVD 11 and the CD 12, respectively. On the other hand, the diameter Dc determines light quantity balance in the above three regions 4a, 4b, and 4c. By doing so, a sum of quantities of light transmitting the regions 4a and 4c and a quantity of light transmitting the region 4b are well balanced at an appropriate ratio, so as to respectively reproduce the corresponding disks.

In the above-described arrangement, the light emitted from the light source 1 is collimated by the collimating lens 2 so as to become a parallel light flux 5 (with a light flux diameter Da), and the light flux 5, whose direction is changed by the reflection mirror 3, enters the objective lens 4. Then, the light flux 5 is converged by the objective lens 4. Herein, in the case where the DVD 11 is reproduced, light having transmitted the regions 4a and 4c is projected on the information recording surface of the DVD 11 so as to form a spot thereon, as illustrated in FIG. 3(b) which is an enlarged view of a section A of FIG. 3(a). In the case where light having transmitted the region 4b is projected on the information recording surface of the CD 12 so as to form a spot thereon, as illustrated in FIG. 3(d) which is an enlarged view of a section B of FIG. 3(c). Thus, the objective lens 4 is arranged so as to have a focus at a plurality of positions and numerical apertures corresponding to different types of optical disks, thereby being capable of reproducing the different types of optical disks.

Figure 4A:
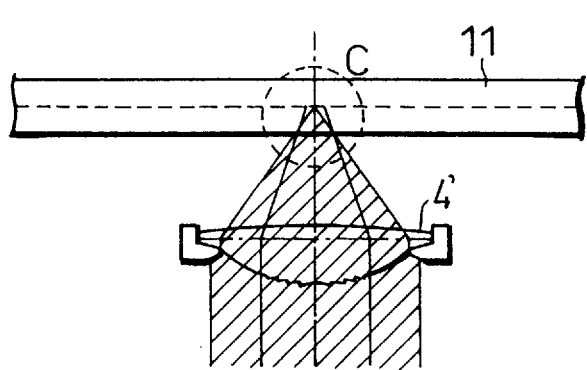
FIG. 4(a) is a cross sectional view illustrating a state where a light flux, passing through an objective lens which is partly shaped in a hologram-lens form, is converged onto an information recording surface of the DVD.
Figure 4B:
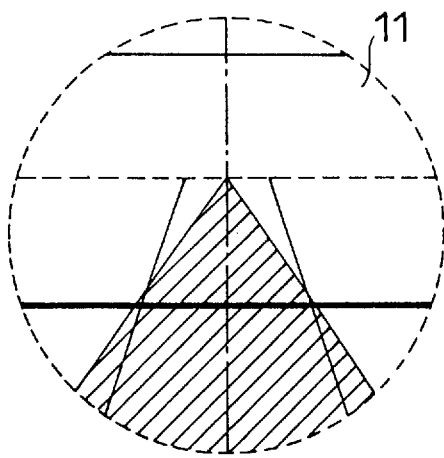
FIG. 4(b) is an enlarged view of a section C in FIG. 4(a).
Figure 4C:
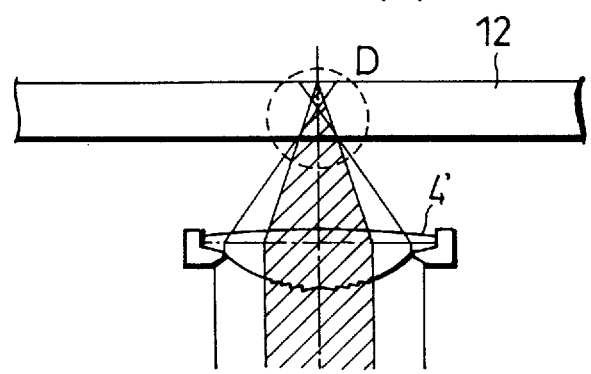
FIG. 4(c) is a cross-sectional view illustrating a state where a light flux passing through the objective lens is converged onto an information recording surface of the CD.
Figure 4D:
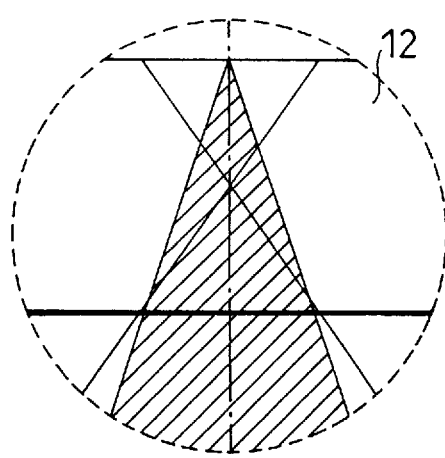
FIG. 4(d) is an enlarged view of a section D in FIG. 4(c).
Figure 4E:
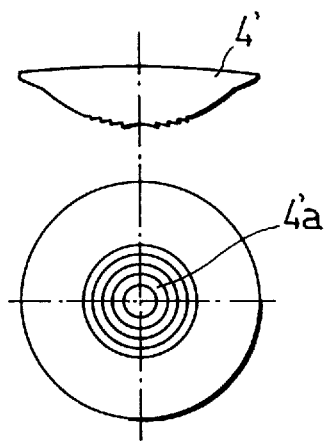
FIG. 4(e) is a cross-sectional view and a plan view of the objective lens.

It should be noted that an objective lens 4' whose one surface on the light flux entrance side is partly shaped in a hologram lens form may be substituted for the objective lens 4, as illustrated in FIGS. 4(a), 4(c), and 4(e). In this case, for reproducing the DVD 11, light having transmitted the objective lens 4' is projected on the information recording surface of the DVD so as to form a spot thereon, as illustrated in FIG. 4(b) which is an enlarged view of a section C in FIG. 4(a). For reproducing the CD 12, light having transmitted a concavo-convex region 4'a of the objective lens 4' is projected on the information recording surface of the CD 12 so as to form a spot, as illustrated in FIG. 4(d) which is an enlarged view of Section D in FIG. 4(c). Therefore, in the case of the objective lens 4' also, the objective lens 4' is arranged so as to have a focus at a plurality of positions and numerical apertures corresponding to different types of optical disks, thereby being capable of reproducing the different types of optical disks.

Figure 2:
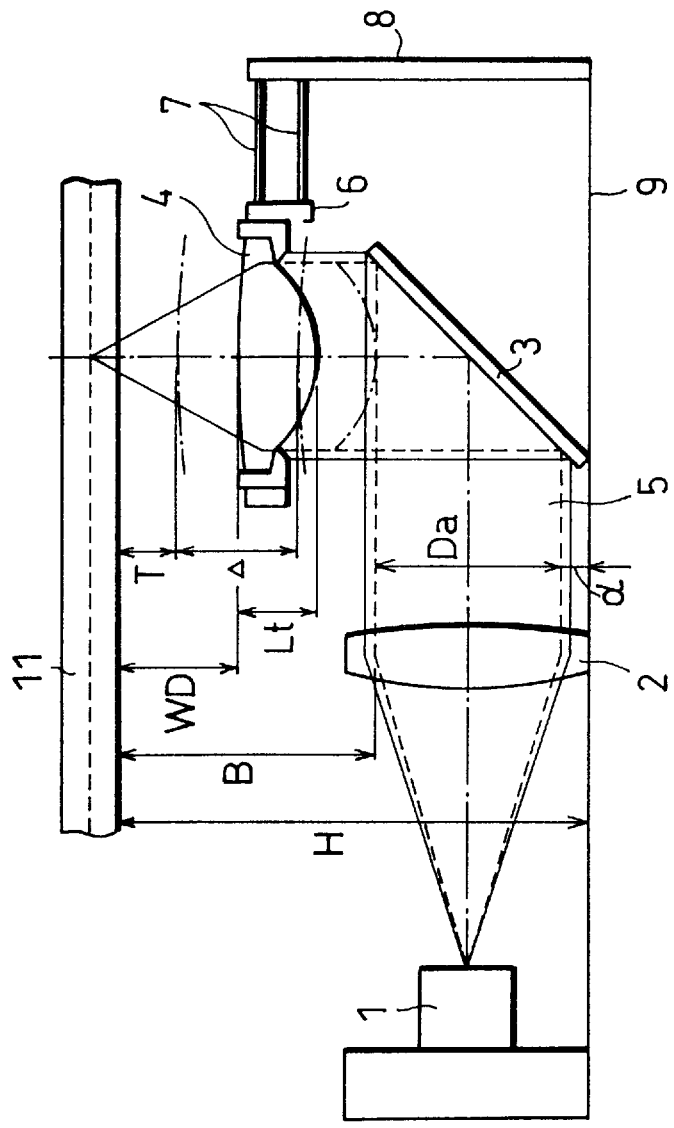
FIG. 2 is a cross-sectional view illustrating an arrangement of the optical recording and reproducing device.

The following description will explain a thickness dimension of the optical recording and reproducing device of the present embodiment. In FIG. 2, WD is a dimension (working distance) from a lower surface of the DVD 11 to an upper surface of the objective lens 4, Lt is a thickness of the objective lens 4, Δ is a necessary motion range of the objective lens 4, Da is an outside diameter of the light flux 5 for the greater numerical aperture NA, Db is an outside diameter of the light flux 5 for the smaller numerical aperture NA (see FIG. 1), and α is leeway for absorbing processing errors caused during processing a mirror, assembling errors, and the like. Then, H, which is a height of the optical head, is expressed as:

$$H = WD + Lt + \Delta/2 + Da + \alpha$$

$$(\text{or, } H = WD + Lt + \Delta/2 + Db + \alpha)$$

Figure 5:
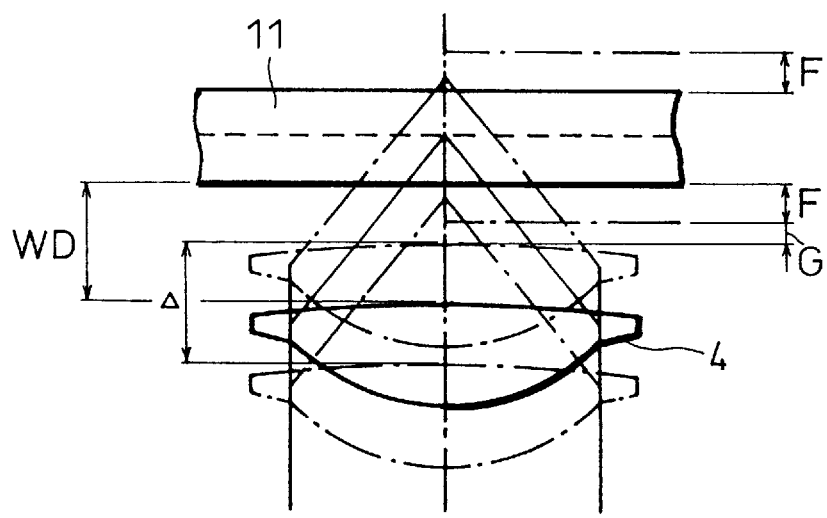
FIG. 5 is a cross-sectional view showing a working distance of an objective lens, a necessary motion range of the objective lens, a deflection standard of a disk, and a gap in between the objective lens and the disk.

Herein, WD is calculated as follows. As illustrated in FIG. 5, a deflection standard F is ±0.3 mm in the case of the DVD 11, whereas a deflection standard F is ±0.5 mm in the case of the CD 12 (see FIG. 3). Thus, the deflection standard F for the DVD 11 which requires a light flux with a larger diameter is strict, whereas the deflection standard F for the CD 12 which requires a light flux with a smaller diameter is relatively lax.

A relative dimension error in a position where a disk is held and a position where the optical head is disposed is ±0.3 mm. Then, the necessary motion range Δ of the objective lens 4 is a sum of the deflection standard F and the dimension error, that is, 1.2 mm (±0.6 mm) in the case of the DVD 11, whereas 1.6 mm (±0.8 mm) in the case of the CD 12. Besides, a gap G of, for example, 0.3 mm is provided so that the objective lens 4 at a top position may not touch the disk.

Therefore, from $WD = F + \Delta/2 + G$, WD1 and WD2 of the DVD 11 and the CD 12 are, respectively:

$$WD1 \geq 0.3 + 0.6 + 0.3 = 1.2 \text{ mm}$$

$$WD2 \geq 0.5 + 0.8 + 0.3 = 1.6 \text{ mm}$$

Furthermore, the thickness Lt of the objective lens 4 more or less varies with material and design thereof, but for example, it is 2.0 mm in the present embodiment. As shown in FIGS. 1(a) and 1(b), in the case where the numerical aperture NA is 0.6 for the DVD 11, the light flux diameter Da is about φ4.0 mm, whereas in the case where the numerical aperture NA is 0.38 for the CD 12, the light flux diameter Db is φ2.5 mm. In the present embodiment, the leeway α is set to 0.2 mm.

Therefore, the heights H1 and H2 of the optical head are derived from the foregoing formulas, respectively, as follows:

$$\begin{aligned} H1 &= WD1 + Lt + (\Delta 1)/2 + Da + \alpha \\ &= 1.2 + 2.0 + 1.2/2 + 4.0 + 0.2 \\ &= 8.0 \text{ mm} \\ H2 &= WD2 + Lt + (\Delta 2)/2 + (Db/2 + Da/2) + \alpha \\ &= 1.6 + 2.0 + 1.6/2 + (2.5/2 + 4/2) + 0.2 \\ &= 7.85 \text{ mm} \end{aligned}$$

Herein, the higher among H1 and H2 is selected as the height of the optical head, and hence the height of the optical head is set to 0.8 mm.

Figure 7A:
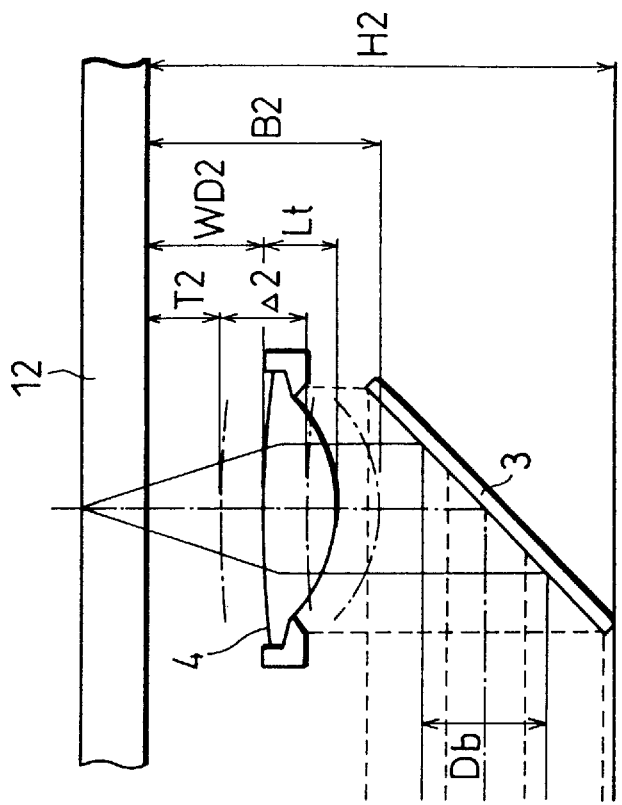
FIG. 7(a) is a reproducing operation of a conventional optical recording and reproducing device with respect to the DVD.
Figure 7B:
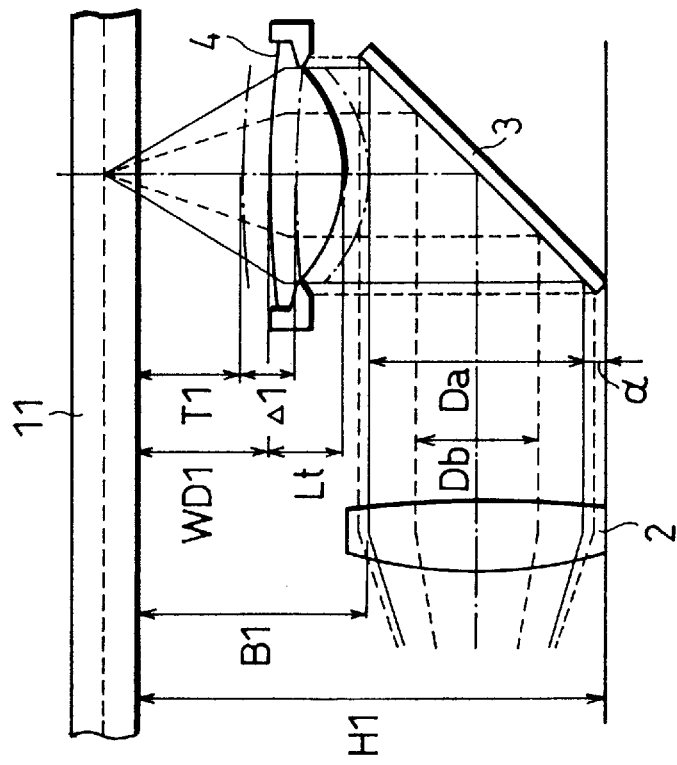
FIG. 7(b) is a cross-sectional view illustrating a state where the CD is reproduced by the conventional optical recording and reproducing device.

Incidentally, in the conventional case, since WD1 is 2.0 mm and WD2 is 1.6 mm, the heights H1 and H2 of the optical head in FIGS. 7(a) and 7(b) are likewise found as:

$$\begin{aligned} H1 &= WD1 + Lt + (\Delta 1)/2 + Da + \alpha \\ &= 2.0 + 2.0 + 1.2/2 + 4.0 + 0.2 \\ &= 8.8 \text{ mm} \\ H2 &= WD2 + Lt + (\Delta 2)/2 + (Db/2 + Da/2) + \alpha \\ &= 1.6 + 2.0 + 1.6/2 + (2.5/2 + 4/2) + 0.2 \\ &= 7.85 \text{ mm} \end{aligned}$$

Therefore, in this case, the height of the optical head is set to 8.8 mm. Consequently, the optical head of the present invention is 0.8 mm thinner than the conventional one.

Thus, by setting the working distances WD1 and WD2 in accordance with the deflection standards F, positions of a focus (hereinafter referred to as focus position) of the objective lens 4 with respect to the DVD 11 and the CD 12 are set in accordance with the deflection standards F for the DVD 11 and the CD 12, respectively. In this case, as compared with the conventional case wherein the deflection standard F is not taken in consideration, a distance between the objective lens 4 and the DVD 11, that is, the working distance WD1 can be decreased. Therefore, with the aforementioned arrangement, the thickness of the device can be reduced, as compared with the conventional cases.

In the present embodiment, by using the objective lens 4 having the regions 4a, 4b, and 4c, the focus positions of the objective lens 4 are determined in accordance with the numerical apertures NA for the DVD 11 and the CD 12, respectively. In other words, the diameter of the light projected on the DVD 11 or the CD 12 is automatically determined in accordance with the numerical apertures NA of the objective lens 4. By doing so, spots with desired diameters are formed on the DVD 11 and CD 12 without failure, respectively.

Note that in the present embodiment, the objective lens 4 is provided so that the motion range of the objective lens 4 for reproducing the DVD 11 is within the motion range thereof for reproducing the CD 12. Moreover, the objective lens 4 is provided so that the top point of the objective lens 4 for reproducing the DVD 11 coincides with the top point of the objective lens 4 for reproducing the CD 12. In other words, by doing so, a difference between the respective bottom points of the objective lens 4 for reproducing the DVD 11 and for reproducing the CD 12 is made great.

Herein, as shown in FIG. 1(a), let the distance between the top point of the objective lens 4 and the DVD 11 be T1, and a distance between the bottom point of the objective lens 4 and the DVD 11 be B1. Likewise, as shown in FIG. 1(b), let a distance between the top point of the objective lens 4 and the CD 12 be T2, and a distance between the bottom point of the objective lens 4 and the CD 12 be B2. Then, T1, B1, T2, and B2 are expressed as:

$$T1 = WD1 - (\Delta 1)/2$$

$$B1 = WD1 + (\Delta 1)/2 + Lt$$

$$T2 = WD2 - (\Delta 2)/2$$

$$B2 = WD2 + (\Delta 2)/2 + Lt$$

Herein, the working distances WD1 and WD2 are set in accordance with, for example, shapes of the regions 4a, 4b, and 4c of the objective lens 4 (see FIG. 3), so that $T1 \geq T2$ and $B1 \leq B2$ when $\Delta 1 \leq \Delta 2$ while $T1 \leq T2$ and $B1 \geq B2$ when $\Delta 1 > \Delta 2$.

By doing so, the motion range of the objective lens 4 when reproducing an information recording medium which requires a light flux of a large diameter (for example, the DVD 11) is within the motion range of the objective lens 4 when reproducing an information recording medium which requires a light flux of a small diameter (for example, the CD 12). Therefore, the motion range of the objective lens 4 is made minimum. As a result, a load on a driving system (not shown) of the objective lens 4 is made minimum.

In addition, the objective lens 4 is arranged so that B1<B2, whereby a bottom point BP of the objective lens 4 for reproducing the CD 12 falls in a light flux with a diameter Da before striking on the reflection mirror and does not fall in a light flux with a diameter Db before striking on the reflection mirror 3. By doing so, the motion range of the objective lens 4 is further lowered. The light flux projected on the CD 12 is not intercepted by the objective lens 4 but is directly guided to the CD 12, reflected by the reflection mirror 3. Therefore, the device can be made further thinner by making the motion range of the objective lens 4 as low as possible, with necessary optical paths not intercepted.

Furthermore, the thickness of the optical head can be minimized by setting the working distances WD1 and WD2 so that when (B2–B1)<(Da–Db)/2, the following relation is satisfied:

$$(T2-T1) \geq (Da-Db)/2 - (B2-B1)$$

Figure 6:
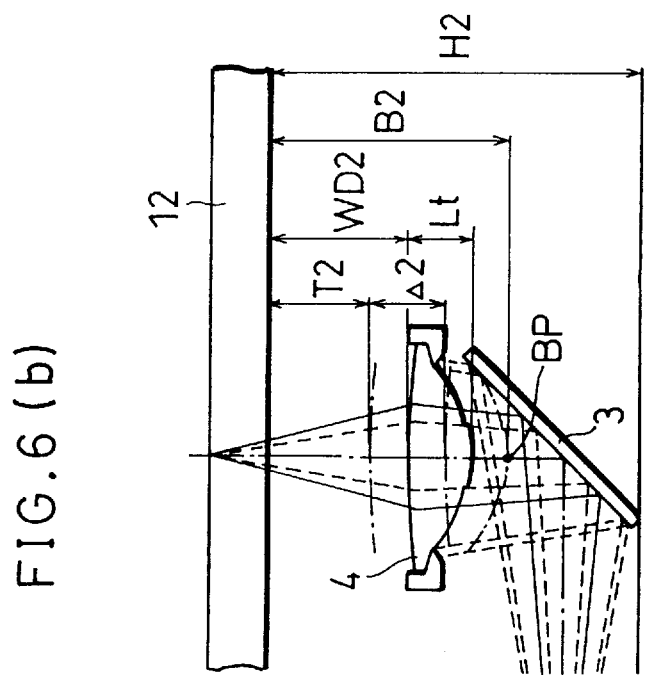
FIG. 6(a) is a cross-sectional view illustrating a state where the DVD is reproduced by a reproducing operation of the optical recording and reproducing device with the use of diverging light.
FIG. 6(b) is a cross-sectional view illustrating a state where the CD is reproduced by the optical recording and reproducing device with the use of diverging light.
Figure 6:
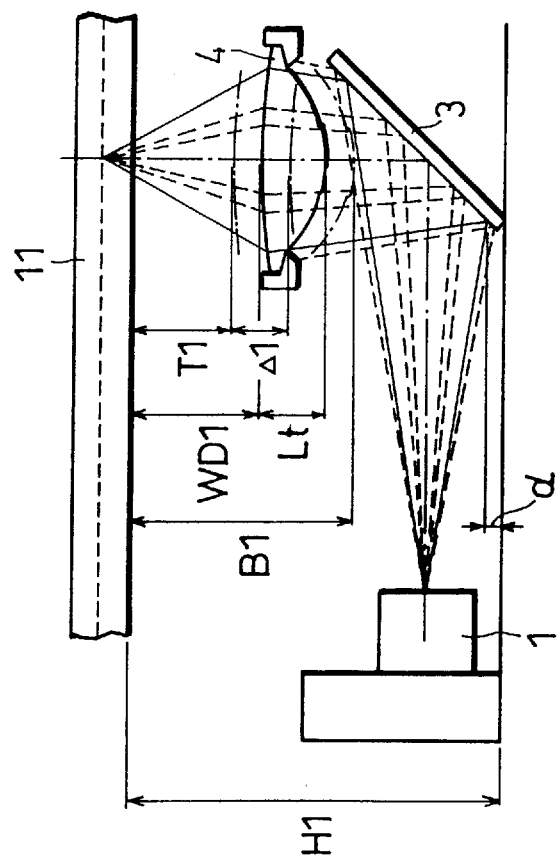

Note that in the case where the light striking on the reflection mirror 3 is not a parallel light but a diverging light, as shown in FIG. 6, the objective lens 4 may be provided in the same manner as above. In other words, the objective lens 4 is provided so that the bottom point BP of the objective lens 4 falls in the light flux before striking on the reflection mirror 3 while does not fall in the light flux before striking on the reflection mirror 3. By doing so, the same effect as that of the present embodiment can be achieved.

[Second Embodiment]

The following description will explain another embodiment of the present invention, while referring to FIGS. 8 through 15. The members having the same structure (function) as those in the first embodiment will be designated by the same reference numerals and their description will be omitted.

In the first embodiment, the working distances WD1 and WD2 of the objective lens 4 are set in accordance with, for example, shapes of the regions 4a, 4b, and 4c (see FIG. 3) of the objective lens 4, so that T1≧T2 and B1≦B2 when Δ1≦Δ2, while T1≦T2 and B1≧B2 when Δ1>Δ2. The sum of quantities of the light transmitting the regions 4a and 4c and the quantity of the light transmitting the region 4b are well balanced at an appropriate ratio, so that the corresponding disks (the DVD 11 and the CD 12) are reproduced with the respective light quantities.

Herein, in the case where the sum of quantities of the light transmitting the regions 4a and 4c and the quantity of light transmitting the region 4b are set to, for example, 2:1, only ⅔ of the light emitted from the light source 1 is projected onto the DVD 11, while only ⅓ of the light emitted from the light source 1 is projected on the CD 12. In other words, under the above condition, the efficiency in light utilization drops, thereby causing an insufficient quantity of light to be projected onto the DVD 11 or the CD 12.

On the other hand, the same applicant of the present application previously proposed, in the Patent Application No. 8-130167/1996 (Tokuganhei No. 8-130167), an optical recording and reproducing device wherein a ring shaped masking member (light intercepting means) is provided in an optical path between a light source and an information recording medium so as to be concentric with an objective lens, so that the ring-shaped masking member intercepts a part of a light beam directed to the information recording medium.

Herein, Chul Woo Lee and others have reported research results as follows, in their thesis ("A Compact Disk Compatible Digital Video Disk Pickup Using Annular Mask") and the like. In the above-described device, by setting the inside diameter and the outside diameter of the masking member to 2.4 mm and 2.7 mm, respectively, 9/10 of light emitted from the light source is projected on the DVD, which is a high-density disk, whereas 4/10 of light emitted from the light source is projected on the CD, which is a low-density disk. As a result, jitter of the DVD can be decreased by 5 percent, as compared with the case where the masking member is not used.

In other words, in the above device, the efficiency in light utilization is improved, 1.35 times in the case of the DVD and 1.2 times in the case of the CD as much as those in the case of the device of the first embodiment. On the other hand, in the device which the same applicant of the present application previously proposed, the WD1 and the WD2 are not desirably set, and moreover, no attempt is made on making the device thinner, unlike in the first embodiment.

Therefore, improvement of the efficiency in light utilization and thinning of the device are attempted by adapting the masking member as described above to the device of the first embodiment. Exemplifying this case, the present embodiment will be explained as follows.

Figure 8:
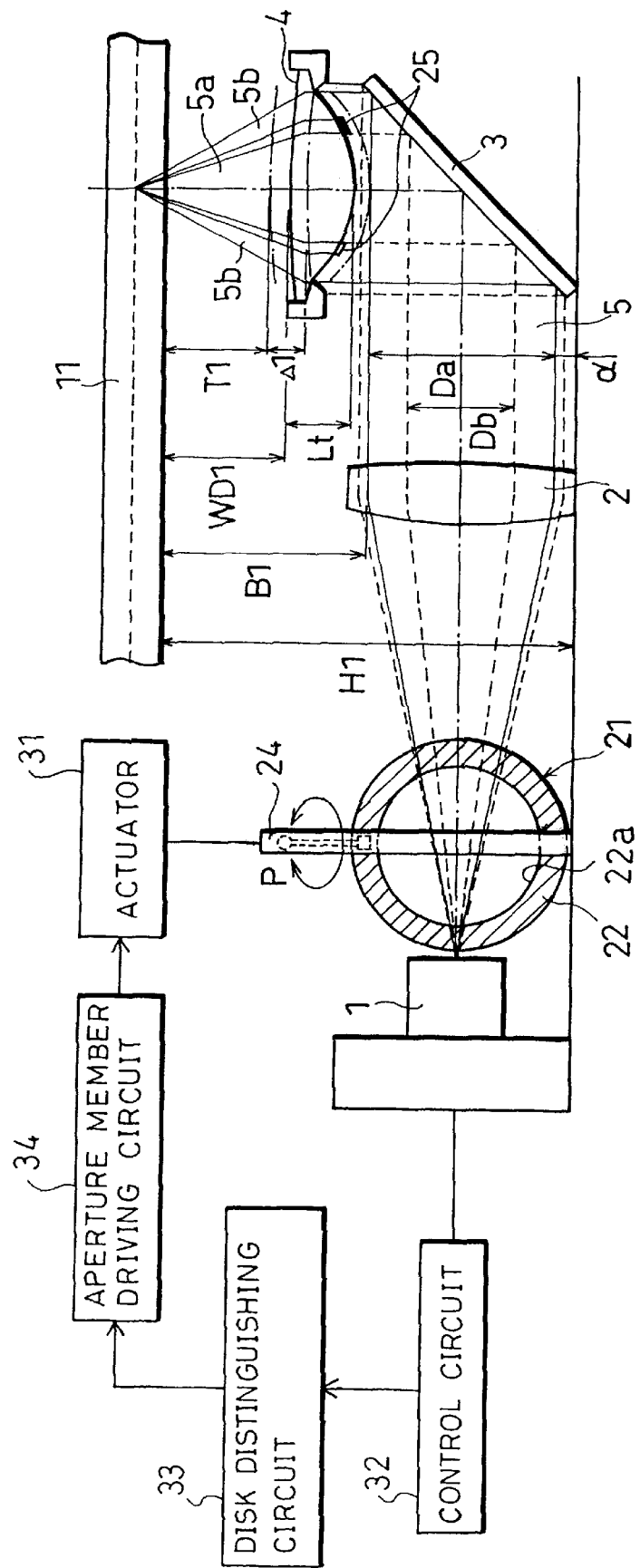
FIG. 8 is a cross-sectional view illustrating a state where the DVD is reproduced by an optical recording and reproducing device having a masking member and a focus position changing lens.
Figure 9:
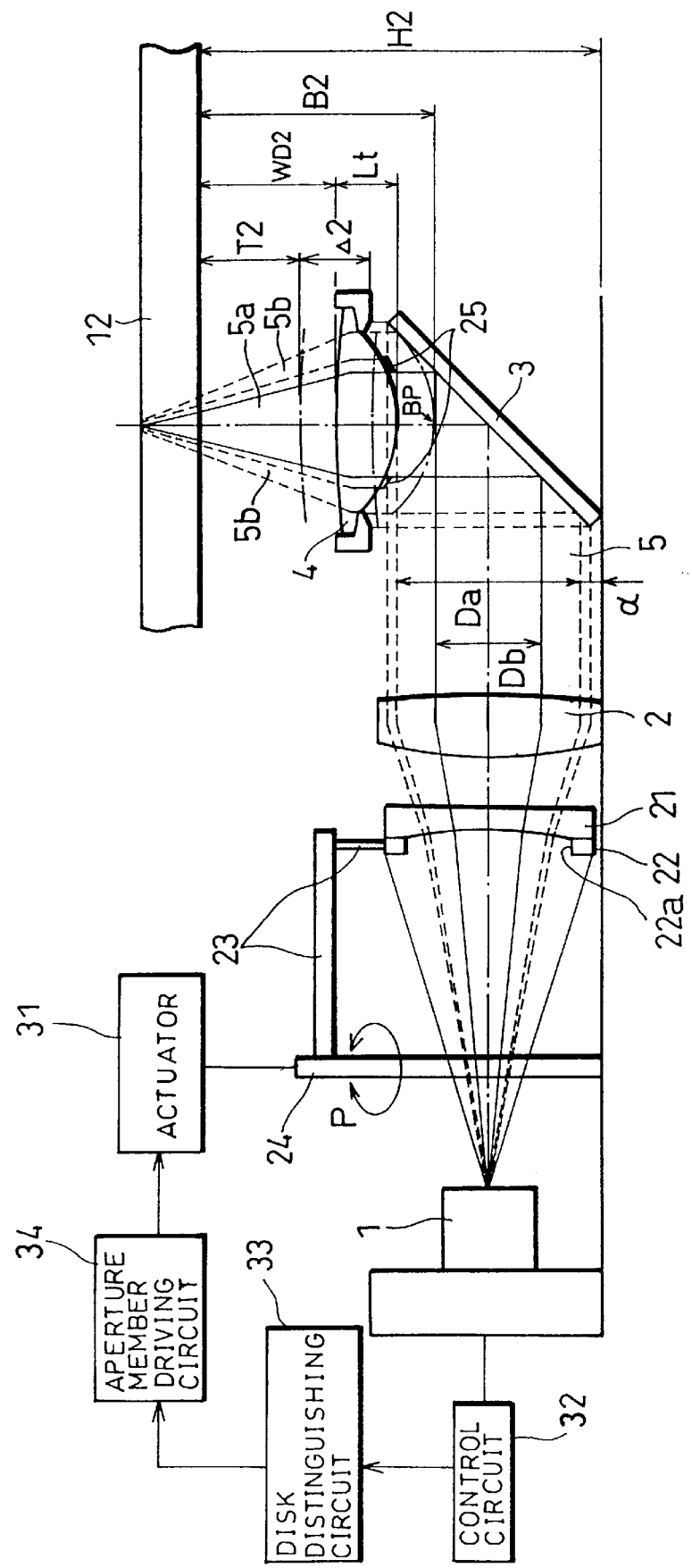
FIG. 9 is a cross-sectional view illustrating a reproducing operation of the optical recording and reproducing device with respect to the CD.

FIGS. 8 and 9 are cross-sectional views illustrating a schematic arrangement of an optical recording and reproducing device of the present embodiment. The device differs from the device of the first embodiment in comprising a focus position changing lens (focus position changing member) 21 which is movably provided so as to be inserted in an optical path between the light source 1 and the objective lens 4 when necessary.

The focus position changing lens 21 is composed of, for example, a spherical concave lens having a concave surface on a side on which a light flux is striking. The focus position changing lens 21 has a function of adjusting a focus position with respect to an information recording medium used. Specifically, the focus position changing lens 21 is designed, for example, so that upon reproducing the CD 12, a working distance has the same value as the WD2 (1.6 mm) in the first embodiment and light transmitting the focus position changing lens 21 is correctly converged on a signal surface of the CD 12.

On a surface of the focus position changing lens 21 on a side on which the light flux is striking, there is provided an aperture member 22. The aperture member 22 has an aperture 22a in the center, and it has a ring shape concentric with the focus position changing lens 21. The aperture member 22 has a function of partly intercepting light directed to the objective lens 4. The aperture member 22 is supported by a first supporting member 23. The first supporting member 23 is supported by a second supporting member 24.

The second supporting member 24 is rotatably provided, so as to be rotated with itself as an axis in a direction indicated by an arrow P in the figure, driven by an actuator 31 as a driver. Note that the actuator 31 is driven by an aperture member driving circuit 34 described layer. Therefore, by rotation of the second supporting member 24 driven by the actuator 31, the focus position changing lens 21 is inserted into and taken away from the optical path between the light source 1 and the objective lens 4. In other words, the first supporting member 23 and the second supporting member 24 support the focus position changing lens 21 with the aperture member 22 therebetween, and insert and remove the focus position changing lens 21 into and out of the optical path between the light source 1 and the information recording medium. Thus, the first and second supporting members 23 and 24 function as supporting means described in claim 20.

As described above, since a position of the focus position changing lens 21 changes, variations of a synthetic optical system are obtained due to a combination of the focus position changing lens 21 and a masking member 25 (described below). Note that the second supporting member 24 is provided at a position such that the second supporting member 24 does not intercept a light flux 5 emitted from the light source 1.

Since the optical system is varied due to different positions of the focus position changing lens 21, it is possible to quickly adjust the device to any one of information recording media having different thicknesses and recording densities. In other words, a synthetic optical system suitable for an information recording medium to be used is surely offered.

In the present embodiment, there is provided a control circuit (optical system selecting means) 32 for selecting one among variations of the synthetic optical system in accordance with the information recording medium to be used. The control circuit 32 drives the aperture member driving circuit 34 in accordance with disk distinction results by the disk distinguishing circuit 33, and this causes the actuator 31 to be driven so that the focus position changing lens 21 is disposed at a desired position corresponding to the information recording medium to be used.

To be more specific, in the present embodiment, upon reproducing the DVD 11, the actuator 31 is driven under control of the control circuit 32, so that with the rotation of the second supporting member 24, the focus position changing lens 21 is taken away from the optical path between the light source 1 and the objective lens 4, as illustrated in FIG. 8. On the other hand, upon reproducing the CD 12, the actuator 31 is driven under control of the control circuit 32 so that with the rotation of the second supporting member 24, the focus position changing lens 21 is inserted into the optical path between the light source 1 and the objective lens 4, as illustrated in FIG. 9.

With this arrangement, an optimal synthetic optical system is correctly selected so as to correspond to an information recording medium to be used, and information reproduction is carried out with precision.

Figure 10:
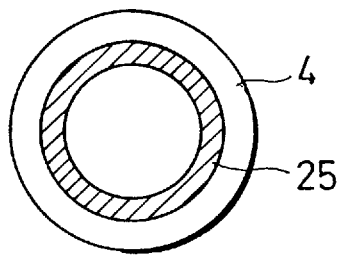
FIG. 10 is a plan view of the masking member.

On a surface of the objective lens 4 on which the light flux is striking, there is provided a half-transparent or opaque masking member 25. The masking member 25 is formed in a ring shape concentric with the objective lens 4, as illustrated in FIG. 10. An inside diameter and an outside diameter of the masking member 25 are set to, for example, 2.4 mm and 2.7 mm, respectively. With this arrangement, as reported in the aforementioned thesis, the efficiency of light utilization is enhanced, as compared with the device of the first embodiment.

The masking member 25 is provided either on the objective lens 4 or on a part whose motion is interlocked with shifting actions of the objective lens 4. With this arrangement, a part of the light flux 5 directed to the objective lens 4 is blocked by the masking member 25. As a result, the light flux 5 directed the objective lens 4 is virtually divided into two light fluxes, one passing through inside the masking member 25 and the other passing outside the masking member 25.

In the case where the DVD 11 is reproduced with the aforementioned arrangement, the actuator 31 is driven up under control of the control circuit 32, which causes the second supporting member 24 to rotate, taking away the focus position changing lens 21 from the optical path between the light source 1 and the objective lens 4, as illustrated in FIG. 8. As a result, the light emitted from the light source 1 by no means passes through the focus position changing lens 21 but is collimated by the collimating lens 2, thereby becoming a parallel light flux 5. A reflection mirror 3 changes a course of the light flux 5, causing the light flux 5 to enter the objective lens 4.

Figure 11:
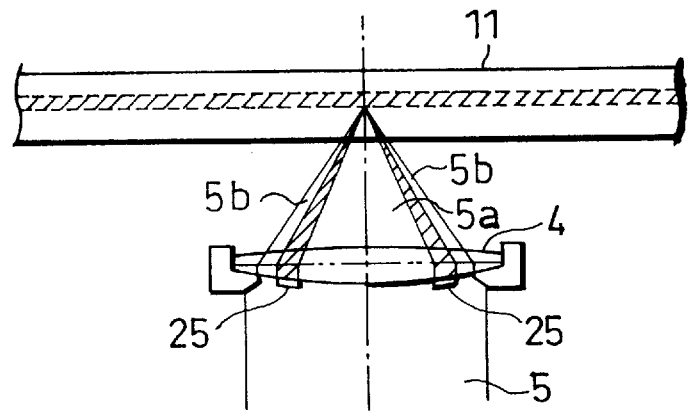
FIG. 11 is a cross-sectional view illustrating a state where the DVD is reproduced by the optical recording and reproducing device by the use of the masking member.

Herein, since the above-described masking member 25 is provided on the objective lens 4, a part of the light flux 5 directed to the objective lens 4 is blocked by the masking member 25. Then, as illustrated in FIG. 11, light fluxes 5a and 5b passing through inside and outside the masking member 25, respectively, are converged by the objective lens 4 substantially on one point. Thus, a light spot is projected on the signal surface of the DVD 11. Note that a working distance in this case is equal to the WD1 (1.2 mm) of the first embodiment.

On the other hand, in the case where the CD 12 is reproduced, the actuator 31 is driven under control by the control circuit 32, which causes the second supporting member 24 to rotate, inserting the focus position changing lens 21 into the optical path between the light source 1 and the objective lens 4, as illustrated in FIG. 9. As a result, the light emitted from the light source 1 passes through the focus position changing lens 21. The light is collimated by the collimating lens 2, thereby becoming a parallel light flux 5. The reflection mirror 3 changes a course of the light flux 5, causing the light flux 5 to enter the objective lens 4.

Figure 12:
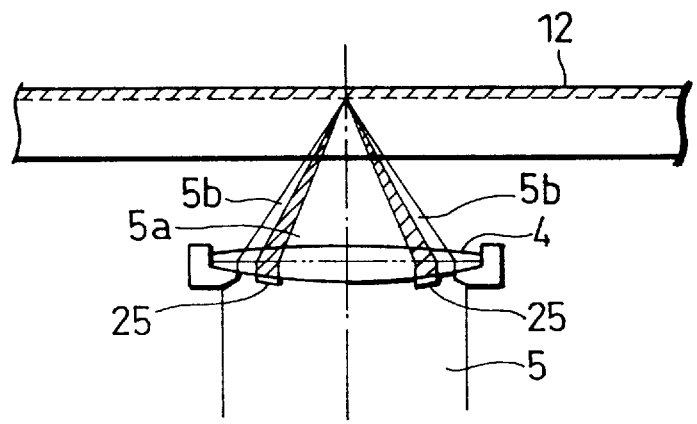
FIG. 12 is a state where the CD is reproduced by using the masking member.

Herein, since the above-described masking member 25 is provided on the objective lens 4, a part of the light flux 5 directed to the objective lens 4 is blocked by the masking member 25. Then, as illustrated in FIG. 12, light flux 5a passing through inside the masking member 25 is converged substantially on one point by the objective lens 4. Thus, a light spot is projected on the signal surface of the CD 12. Note that a working distance in this case is equal to the WD2 (1.6 mm) of the first embodiment.

Thus, by applying the masking member 25 to the device of the first embodiment, the efficiency of light utilization is improved, as compared with the device of the first embodiment. Besides, since the focus position changing lens 21 is inserted in the optical path between the light source 1 and the objective lens 4 when necessary, the focal point is moved so as to be adjusted to an information recording medium used. Moreover, the working distances of the DVD 11 and the CD 12 are equal to the WD1 and WD2 in the first embodiment, respectively.

Therefore, with the above-described arrangement, the distance between a certain information recording medium (for example, the DVD 11) and the objective lens 4 is shortened, and as a result the device is thinned, as compared with the conventional case where the focus position changing lens 21 is not provided. As a result, an optical recording and reproducing device which can achieve improvement of the efficiency of light utilization and the thinning of the device at the same time can be obtained.

Note that upon reproducing the CD 12, the light flux 5b passing outside of the masking member 25 is not converged on the signal surface of the CD 12, as described in Tokugan-hei No. 8-130167 which has been previously filed. In other words, the light flux 5b does not contribute to the reproduction of the CD 12, and only the light flux 5a passing through inside the masking member 25 is converged on the signal surface of the CD 12, the converging point thereof constituting a focus. Therefore, a numerical aperture NA which the objective lens 4 has so as to be focused on the signal surface of the CD 12 is determined by the inside diameter of the masking member.

Figure 13:
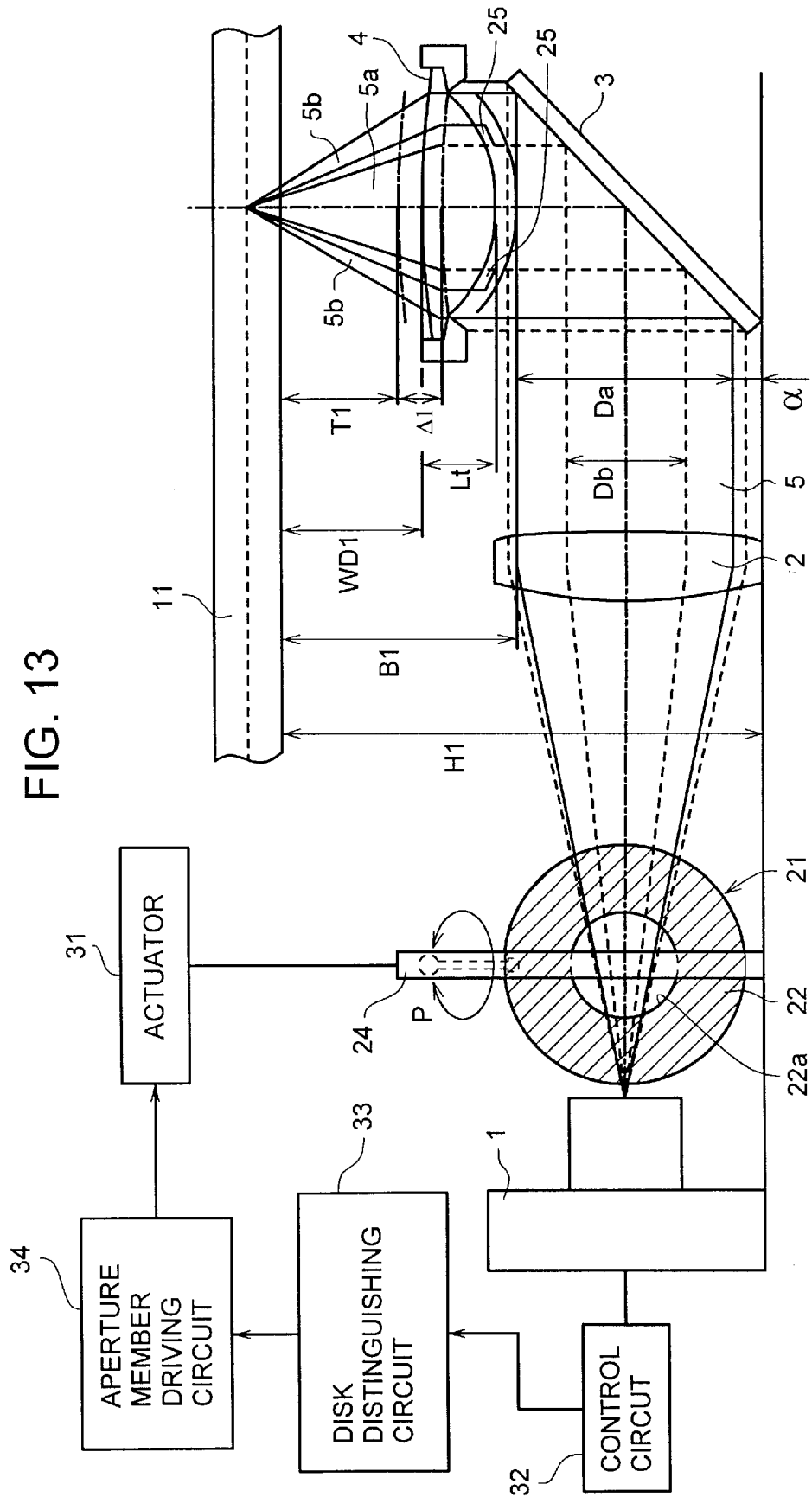
FIG. 13 is a cross-sectional view illustrating a state where the DVD is reproduced by using an aperture member which is provided on the focus position changing lens and is designed so that a quantity of light passing outside of the masking member decreases.
Figure 14:
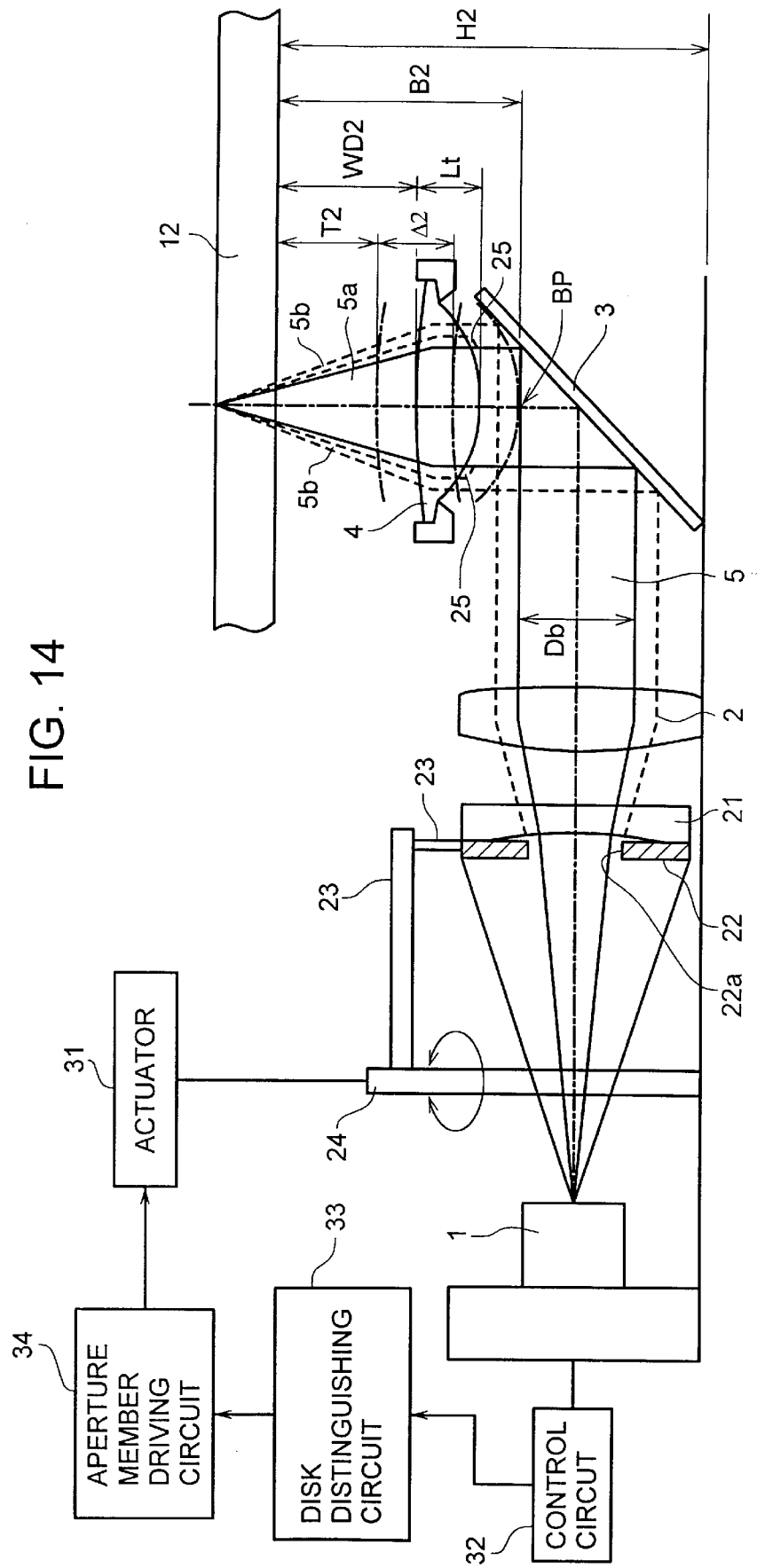
FIG. 14 is a cross-sectional view illustrating a state the CD is reproduced by using the aperture member.

Therefore, in the case where the inside diameter of the aperture member 22 is set so that the quantity of the light flux 5b passing outside the masking member 25 decreases, this does not affect the numerical aperture of the objective lens 4, and hence the CD 12 is reproduced without any problem. Herein, FIGS. 13 and 14 illustrate a schematic arrangement of an optical recording and reproducing device having the aperture member 22 whose inside diameter is set as such. More specifically, the inside diameter of the aperture member 22 is set larger than that of the masking member 25, and smaller than the aperture diameter of the objective lens 4.

On reproducing the DVD 11, as illustrated in FIG. 13, the actuator 31 is driven under control by the control circuit 32, which causes the second supporting member 24 to rotate, taking away the focus position changing lens 21 from the optical path between the light source 1 and the objective lens 4. In this case, as described above, the light emitted from the light source 1 by no means passes through the focus position changing lens 21 but is collimated by the collimating lens 2, thereby becoming a parallel light flux 5 with a light flux diameter Da. A reflection mirror 3 changes a course of the light flux 5, causing the light flux 5 to enter the objective lens 4. Then, the light fluxes 5a and 5b passing through inside and outside the masking member 25, respectively, are converged by the objective lens 4 substantially on one point. Thus, a light spot is projected on the signal surface of the DVD 11.

On the other hand, in the case where the CD 12 is reproduced, the actuator 31 is driven under control by the control circuit 32, which causes the second supporting member 24 to rotate, inserting the focus position changing lens 21 into the optical path between the light source 1 and the objective lens 4, as illustrated in FIG. 14. As a result, among the light emitted from the light source 1, a light flux having passed through the aperture 22a of the aperture member 22 passes through the focus position changing lens 21, entering the collimating lens 2. The light is collimated by the collimating lens 2, thereby becoming a parallel light flux 5 with a light flux diameter Db. The reflection mirror 3 changes a course of the light flux 5, causing the light flux 5 to enter the objective lens 4.

Herein, the inside diameter of the aperture member 22 is set larger than the inside diameter of the masking member 25, while smaller than the aperture diameter of the objective lens 4. In other words, the inside diameter of the aperture member 22 is set so that the light quantity of the light flux 5b passing outside of the masking member 25 decreases. Therefore, at least a part of the light flux 5b which is unnecessary since not being converged on the signal surface of the CD 12 is blocked by the aperture member 22. Thus, in this case, it is possible to use as less of the unnecessary light flux 5b as possible and mainly use the light flux 5a passing through inside the masking member 25, on recording and reproduction of information.

Note that in the present embodiment the focus position changing lens 21 is composed of a spherical concave lens, but the arrangement of the focus position changing lens 21 is not limited to this. Any lens may be used as the focus position changing lens 21 provided that the lens, combined with the objective lens 4, is capable of setting optimal working distances WD1 or WD2 in accordance with an information recording medium used. In other words, other than the above-described lens, for example, a spherical convex lens, a non-spherical lens, or a lens using hologram (hologram element) may be used as the focus position changing lens 21. In such cases, as with the present embodiment, it is possible to precisely focus on any type of an information recording medium used.

Note that to completely compensate aberration by adjusting a focus position, the focus position changing lens 21 should be composed of a non-spherical lens. However, in this case, it is required that an optical axis of the objective lens 4 and an optical axis of the non-spherical lens should be conformed with high precision. On the other hand, in the case of a spherical lens, aberration cannot be completely compensated, but the restriction on precision concerning the optical axis may be relaxed to some extent. Therefore, the focus position changing lens 21 is likely composed of a spherical lens.

On the other hand, a difference of a surface shape of a non-spherical lens is not so different from that of the spherical lens that the difference is visible to eyes, and hence it has an ideal shape with which aberration can be completely compensated with the axis thereof conformed with the axis of the objective lens 4.

Figure 15A:
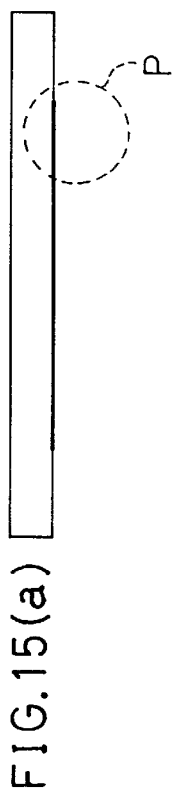
FIG. 15(a) is a side view illustrating a focus position changing lens which is a hologram lens.
Figure 15B:
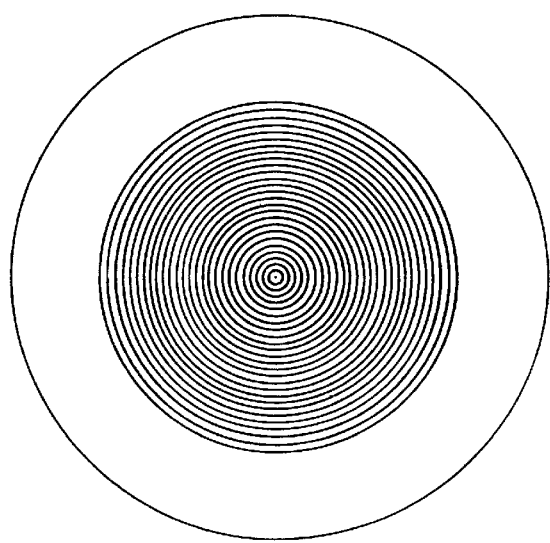
FIG. 15(b) is a plan view of the focus position changing lens.
Figure 15C:
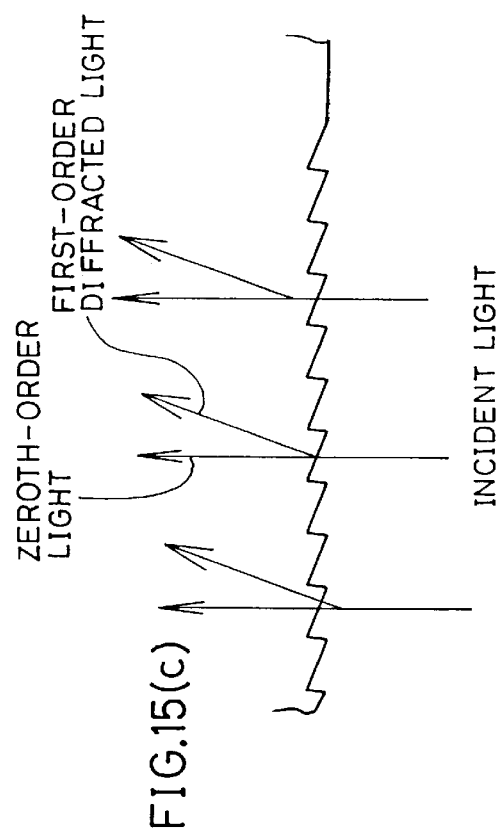
FIG. 15(c) is an enlarged view of the section P in FIG. 15(a).
Figure 16:
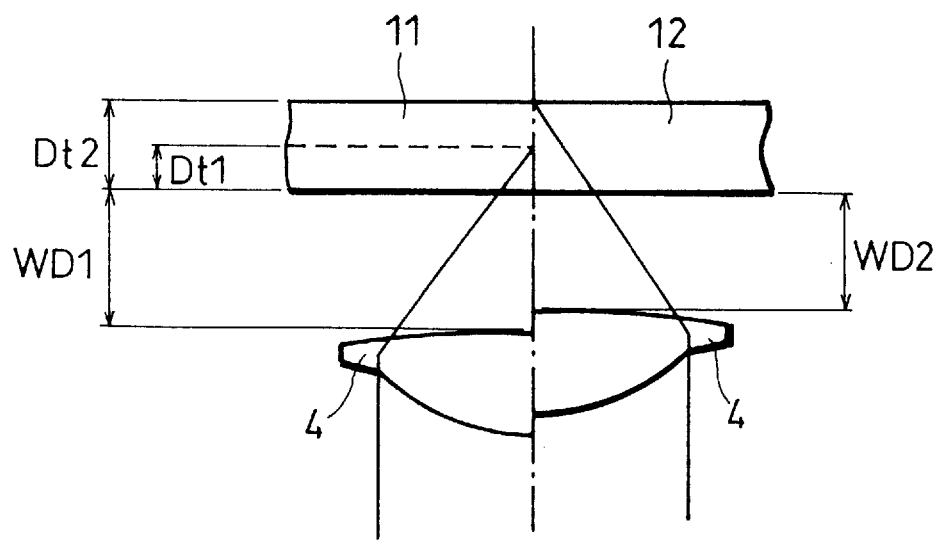
FIG. 16 is a cross-sectional view illustration position relations between the objective lens and the DVD and between the objective lens and the CD.

In the case where a hologram lens is used as the focus position changing lens, the hologram lens, as shown in FIGS. 15(a) through 15(c), has a plurality of grooves in a concentric form. Note that FIG. 15(a) is a side view of the hologram lens, FIG. 15(b) is a plan view of the hologram lens, and FIG. 15(c) is an enlarged view of a section P in FIG. 15(a).

Note that the shape of the objective lens 4 may be any one among various shapes disclosed by Tokuganhei No. 8-130167. In such cases, needless to say, there is no need to provide the masking member 25 thereon.

The first and second embodiments are described concerning the cases where the DVD 11 and the CD 12 are reproduced, but the same effects as those achieved in the first and second embodiments are of course achieved in the cases where information is recorded or erased with respect to the DVD 11 and the CD 12.

As has been described so far, the optical recording and reproducing device of the present invention, which is capable of carrying out recording, reproduction, and erasion of information with respect to information recording media which differ in thickness and recording density, by projecting light thereon, comprises an objective lens designed so as to form a light spot with a first predetermined diameter on a first information recording medium, while so as to form a light spot with a second predetermined diameter on a second information recording medium, the first and second diameters differing from each other, the first and second information recording media differing in recording density, and is characterized in that the device is arranged so that focus positions of the objective lens are set in accordance with respective deflection standards of the first and second information recording media so that the objective lens is in focus with respect to the first and second information recording media, respectively.

According to the aforementioned arrangement, the objective lens is designed so as to form a spot with a first predetermined diameter on a first information recording medium, while so as to form a light spot with a second predetermined diameter different from the first diameter on a second information recording medium having a recording density different from that of the first information recording medium.

Herein, since the positions of a focus of the objective lenses are set in accordance with the deflection standards for the first and second information recording media, respectively, the respective distances between the objective lens and the first information recording medium or between the objective lens and the second information recording medium is shortened, as compared with conventional cases where the deflection standards are not taken into consideration. Therefore, with the aforementioned arrangement, the device can be thinned, compared with the conventional cases.

Besides, the optical recording and reproducing device of the present invention is preferably characterized in that positions of a focus of the objective lens are determined in accordance with numerical apertures of the objective lens.

According to the foregoing arrangement, the diameters of the spots formed on the first and second information recording media are determined in accordance with the numerical apertures of the objective lens respectively. By doing so, spots with desired diameters are surely formed on the first and second information recording media, respectively.

The optical recording and reproducing device of the present invention is preferably characterized in that a motion range of the objective lens corresponding to one of the first and second information recording media is within a motion range thereof corresponding to the other.

With the above arrangement wherein a motion range of the objective lens corresponding to one of the first and second information recording media is within a motion range thereof corresponding to the other, the motion region of the objective lens is minimized. Therefore, with the aforementioned arrangement, a load on the driving system of the objective lens is decreased as compared with conventional cases.

Furthermore, the optical recording and reproducing device of the present invention is preferably characterized in that in the case where the first information recording medium has a higher recording density than that of the second information recording medium, a bottom point of a second motion range of the objective lens corresponding to the second information recording medium is set lower than a bottom point of a first motion range of the objective lens corresponding to the first information recording medium.

Since the above-described arrangement lowers the bottom point of the motion range of the objective lens for the information recording medium with a lower recording density, the motion range itself is lowered on the whole. Therefore, the above arrangement surely makes the device thinner.

Furthermore, the optical recording and reproducing device of the present invention is preferably characterized in that in the case where the first information recording medium has a higher recording density than that of the second information recording medium, a bottom point of a second motion range of the objective lens corresponding to the second information recording medium is positioned within a light flux to be projected on the first information recording medium and not yet striking on a reflection mirror.

With the foregoing arrangement, since the bottom point of the motion range of the objective lens is positioned within a light flux which is to be projected on the information recording medium having a higher recording density and has not yet struck on a reflection mirror, the motion range of the objective lens is further lowered. Therefore, the aforementioned arrangement makes the device further thinner.

Besides, the optical recording and reproducing device of the present invention is preferably characterized in that a position of the focus position changing member is changed, so that a synthetic optical system composed of the focus position changing member in combination with the light intercepting means varies.

With the above arrangement, since the combination of the focus position changing means and the light intercepting means constitutes various types of the synthetic optical system, immediate correspondence can be achieved to any one of information recording media having different thickness and recording densities. In other words, a synthetic optical system to correspond to an information recording medium used can be surely offered.

Furthermore, the optical recording and reproducing device of the present invention is preferably characterized in further comprising optical system selecting means for selecting one among the various types of the synthetic optical system, in accordance with an information recording medium used.

With the aforementioned arrangement, one synthetic optical system corresponding to an information recording medium used is selected among them by the optical system selecting means. Therefore, recording, reproduction, and erasion of information can be carried out by the use of an appropriate synthetic optical system selected so as to correspond to an information recording medium used.

Furthermore, the optical recording and reproducing device of the present invention is preferably characterized in further comprising an aperture member, having an aperture in a center thereof, for partly blocking the light directed to the objective lens, wherein an inside diameter of the aperture member is set larger than an inside diameter of the light intercepting means.

According to the above-described arrangement, an aperture member having an aperture in the center is provided so as to partly block light directed to the objective lens.

Herein, in the case where recording, reproducing, and erasion of information is carried out with respect to an information recording medium having a low recording density, a light flux having passed outside of the light intercepting means is not converged on the information recording medius, and hence scarcely affects recording, reproduction and erasion of information. On the other hand, a light flux having passed through inside the light intercepting member is converged on the information recording medium and a focus is formed on the information recording medium. Therefore, a numerical aperture which the objective lens has so as to be focused on the signal surface of the information recording medium is determined by the inside diameter of the masking member.

However, with the aforementioned arrangement, the inside diameter of the aperture member is set larger than the inside diameter of the light intercepting means, the numerical aperture of the objective lens does not change. Therefore, without affecting the numerical aperture of the objective lens, by mainly using a light flux passing through inside the light intercepting means, recording, reproducing, and erasion of information can be carried out.

The optical recording and reproducing device of the present invention is preferably characterized in further comprising an aperture member, having an aperture in a center thereof, for partly blocking the light directed to the objective lens, wherein an inside diameter of the aperture member is set smaller than an aperture diameter of the objective lens.

According to the aforementioned arrangement, an aperture member for partly blocking light directed to the objective lens is provided. Here, an diameter of the aperture member is set smaller than the aperture diameter of the objective lens. Therefore, at least a part of unnecessary light not converged on the information recording medium is blocked by the aperture member.

Herein, in the case where recording, reproducing, and erasion of information is carried out with respect to an information recording medium having a low recording density, a light flux having passed outside of the light intercepting means is not converged on the information recording medium, and hence scarcely affects recording, reproduction and erasion of information. On the other hand, a light flux having passed through inside the light intercepting member is converged on the information recording medium and a focus is formed on the information recording medium.

Therefore, with the aforementioned arrangement wherein the inside diameter of the aperture member is set smaller than the aperture diameter of the objective lens, the unnecessary light which is not converged on the information recording medium is intercepted as much as possible so as not to be utilized, whereas recording, reproduction, and erasure of information is carried out by mainly using the necessary light passing through inside the light intercepting means.

Furthermore, the optical recording and reproducing device of the present invention is preferably characterized in further comprising a supporting member for supporting the focus position changing member, while moving the focus position changing member so that the focus position changing member is inserted into and taken away from the optical path between the light source and the objective lens.

With the aforementioned arrangement, the focus position changing member is inserted in and taken away from the optical path between the light source and the information recording medium by the supporting member. Therefore, a position of the focus position changing member is changed, so as to constitute various types of synthetic optical systems.

Furthermore, the optical recording and reproducing device of the present invention is preferably characterized in that the focus position changing member is a spherical lens.

With the aforementioned arrangement wherein the focus position changing member is a spherical lens, a focus corresponding to an information recording medium used can be precisely formed thereon.

Besides, the optical recording and reproducing device of the present invention is preferably characterized in that the focus position changing member is a non-spherical lens.

With the aforementioned arrangement wherein the focus position changing member is a non-spherical lens, a focus corresponding to an information recording medium used can be precisely formed thereon.

In addition, the optical recording and reproducing device of the present invention is preferably characterized in that the focus position changing member is a hologram lens.

With the aforementioned arrangement wherein the focus position changing member is a hologram lens, a focus corresponding to an information recording medium used can be precisely formed thereon.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical recording and reproducing device capable of carrying out recording, reproduction, and erasure of information with respect to information recording media which differ in thickness and recording density, by projecting light thereon, said device comprising:

an objective lens designed so as to form a light spot with a first predetermined diameter on a first information recording medium, while so as to form a light spot with a second predetermined diameter on a second information recording medium, the first and second diameters differing from each other, the first and second information recording media differing from each other in recording density, wherein respective distances between said objective lens and said first and second information recording media are set in accordance with deflection standards of said first and second information recording media, respectively.

2. An optical recording and reproducing device capable of carrying out recording, reproduction, and erasure of information with respect to information recording media which differ in thickness and recording density, by projecting light thereon, said device comprising:

an objective lens designed so as to form a light spot with a first predetermined diameter on a first information recording medium, while so as to form a light spot with a second predetermined diameter on a second information recording medium, the first and second diameters differing from each other, the first and second information recording media differing from each other in recording density, wherein said device is arranged so that positions of a focus of said objective lens are set in accordance with respective deflection standards of said first and second information recording media so that said objective lens is in focus with respect to said first and second information recording media, respectively.

3. The optical recording and reproducing device as set forth in claim 2, wherein the positions of the focus of said objective lens are determined in accordance with numerical apertures of said objective lens.

4. The optical recording and reproducing device as set forth in claim 2, wherein a motion range of said objective lens corresponding to one of said first and second information recording media is within a motion range thereof corresponding to the other.

5. The optical recording and reproducing device as set forth in claim 2, wherein:

in the case where said first information recording medium has a higher recording density than that of the second information recording medium, a bottom point of a second motion range of said objective lens corresponding to said second information recording medium is set lower than a bottom point of a first motion range of said objective lens corresponding to said first information recording medium.

6. The optical recording and reproducing device as set forth in claim 2, wherein:

in the case where said first information recording medium has a higher recording density than that of the second information recording medium, a bottom point of a second motion range of said objective lens corresponding to said second information recording medium is positioned within a light flux to be projected on said first information recording medium and not yet striking on a reflection mirror.

7. The optical recording and reproducing device as set forth in claim 2, wherein, in the case where said first information recording medium has a higher recording density than that of said second information recording medium, said objective lens has first, second, and third regions on a surface thereof on which a light flux is striking, said first region being set so that said objective lens has a numerical aperture for forming the light spot with the first predetermined diameter on an information recording surface of said first information recording medium, said second region being set so that said objective lens has a numerical aperture for forming the light spot with the second predetermined diameter on an information recording surface of said second information recording medium, said third region being set so that a sum of quantities of light transmitting said first and third regions and a quantity of light transmitting said second region are balanced at a predetermined ratio.

8. The optical recording and reproducing device as set forth in claim 2, said objective lens is a hologram lens having a concavo-convex region, the hologram lens being designed so that light transmitting the concavo-convex region forms a light spot with a predetermined diameter on an information recording surface of either said first information recording medium or said second information recording medium.

9. The optical recording and reproducing device as set forth in claim 2, wherein a distance between said first information recording medium and said objective lens and a distance between said second information recording medium and said objective lens are set so as to satisfy:

when $(B2-B1)<(Da-Db)/2$, $(T2-T1) \geq (Da-Db)/2-(B2-B1)$ where T1 is a distance between said first recording medium and a top point of a first motion range of said objective lens corresponding to said first information recording medium, B1 is a distance between said first information recording medium and a bottom point of the first motion range, T2 is a distance between said second information recording medium and a top point of a second motion range of said objective lens corresponding to said second information recording medium, B2 is a distance between said second information recording medium and a bottom point of the second motion range, Da is a diameter of a light flux projected on said first information recording medium, and Db is a diameter of a light flux projected on said second information recording medium.

10. The optical recording and reproducing device as set forth in claim 2, wherein light entering said objective lens is parallel light.

11. The optical recording and reproducing device as set forth in claim 2, wherein light entering said objective lens is diverging light.

12. An optical recording and reproducing device as set forth in claim 2, further comprising:

light intercepting means for partly blocking light directed to said objective lens, said light intercepting means being provided either on said objective lens or on a part whose motion is interlocked with shifting actions of said objective lens; and focus position changing member for adjusting a position of a focus in accordance with an information recording medium used, so that the focus comes on the information recording medium, said focus position changing member being movably provided so as to be inserted in an optical path between a light source and said objective lens when necessary.

* * * * *